United States Patent [19]
Hernandez et al.

[11] Patent Number: 5,393,123
[45] Date of Patent: Feb. 28, 1995

[54] VEHICLE SEAT ASSEMBLY WITH INTEGRAL BELT RESTRAINT AND SEAT BACK DUMP FEATURE

[75] Inventors: Cynthia L. Hernandez, Plymouth; David W. Husted, Ann Arbor, both of Mich.

[73] Assignee: Hoover Universal, Inc., Plymouth, Mich.

[21] Appl. No.: 101,201

[22] Filed: Aug. 3, 1993

[51] Int. Cl.$^6$ ............................................. B60N 2/02
[52] U.S. Cl. ........................... 297/378.12; 297/362.11; 297/362.14
[58] Field of Search ............... 297/378.12, 362.11, 297/362.12, 362.14

[56] References Cited

U.S. PATENT DOCUMENTS

| | | | |
|---|---|---|---|
| 3,322,461 | 5/1967 | Goldman et al. | 297/378.12 |
| 3,792,898 | 2/1974 | Lindbert | 297/378.12 |
| 4,268,086 | 5/1981 | Okuyama | 297/378.12 |
| 4,402,547 | 9/1983 | Weston et al. | 297/362.11 |
| 4,632,421 | 12/1986 | Shamie | 297/378.12 |
| 5,299,853 | 4/1994 | Griswold et al. | 297/362.12 |

FOREIGN PATENT DOCUMENTS

| | | | |
|---|---|---|---|
| 2453732 | 5/1976 | Germany | 297/378.12 |
| 15179 | 9/1980 | Germany | 297/378.12 |
| 3504166 | 8/1986 | Germany | 297/378.12 |

*Primary Examiner*—John T. Kwon
*Attorney, Agent, or Firm*—Harness, Dickey & Pierce

[57] ABSTRACT

A seat assembly with an integrated seat belt system is provided with a power recliner mechanism and a seat back dump feature. The dump feature includes a toggle latch mechanism for latching the seat back in place and for unlatching the seat back to enable forward rotation to a dump position without affecting the adjusted angular position of the seat back when it is returned from the dump position. An overcenter spring operates to hold the toggle latch mechanism in either its latched or released positions.

19 Claims, 5 Drawing Sheets

VEHICLE SEAT ASSEMBLY WITH INTEGRAL BELT RESTRAINT AND SEAT BACK DUMP FEATURE

BACKGROUND AND SUMMARY OF THE PRESENT INVENTION

The present invention relates generally to vehicle seat assemblies and in particular to seat assemblies including an integral seat belt restraint systems and a dump feature for the seat back.

Vehicle seat belt systems are typically mounted directly to a vehicle structure. For example, many belt systems have a webbing retractor mounted to the vehicle floor pan with the webbing extending upward, along the B-pillar of the vehicle, to a D-ring mounted to the pillar near its upper end. The webbing then extends downward to an end connected to the floor pan adjacent to the retractor. A clasp is slidably movable along the webbing between the attached end and the D-ring. A buckle is attached to the vehicle floor on the opposite side of a seat assembly. When the clasp is pulled across the seat occupant and inserted into the buckle, the webbing forms a lap belt and a shoulder belt to retain the occupant in the seat assembly.

The position of a front seat assembly in a motor vehicle is adjustable relative to the vehicle interior in at least the fore and aft direction and, in some seat assemblies adjustable in other directions as well. With movement of the seat assembly relative to the vehicle, there is also movement of the seat assembly relative to the seat belt system. This relative movement can result in the belt system becoming inconvenient and/or uncomfortable to use. To improve both the comfort and convenience of using a seat belt, seat assemblies are now being designed which incorporate the seat belt system directly into the seat assembly. This ensures that regardless of the position of the seat assembly relative to the vehicle, the seat belt system will remain in one position relative to the seat occupant. Such a seat assembly is often referred to as an integrated structural seat assembly in that the seat belt system has been integrated into the seat assembly. An integrated structural seat has a further advantage of facilitating the assembly of the motor vehicle. Instead of attaching separate restraint system components to the vehicle structure at various locations and also attaching a seat assembly to the vehicle floor pan, the vehicle assembler will only need to attach the integrated structural seat to the vehicle structure.

However, the integrated structural seat must also carry the additional seat belt load during a vehicle collision. As a result, the structural frame of an integrated seat must be significantly increased in its strength to accommodate the increased load. The present invention is related to a dump feature provided in an integrated seat for releasing the seat back, allowing the seat back to be rotated to a forwardmost "dump" position to facilitate access to the rear seat area of a two-door motor vehicle. In an integrated seat assembly with the shoulder restraint belt attached to the seat back, it is necessary that the latch for the seat back dump mechanism be sufficiently strong to accommodate the shoulder belt loads. In addition, it is also necessary that when the seat back is returned from the dump position, latching of the seat back is assured.

Accordingly, it is an object of the present invention to provide a seat back dump mechanism which is able to accommodate the shoulder belt loads and also to ensure latching upon return of the seat back to its operative use position.

It is a further object of the present invention to provide such a dump feature in a seat assembly having a power seat back recliner mechanism.

A power recliner mechanism is typically designed so as to be continuously engaged to hold the seat back in place. Thus, to provide a dump mechanism in a seat assembly with a power recliner, it is necessary that the dump mechanism operate separately from the continuously engaged power recliner.

The seat assembly includes a fore and aft slide track to which the seat cushion and seat back are both mounted. The seat back is mounted for rotation about a transverse axis. The power recliner includes a threaded lead screw with a first end pivotally connected to the slide track and a spin nut threadably engaging the lead screw and captured within a drive housing that is pivotally coupled to the seat back frame. A motor is provided for driving the spin nut along the length of the lead screw affecting the distance between the drive housing coupled to the seat back frame and the connection of the lead screw to the slide track. This results in an angular adjustment of the seat back position.

Seat back dumping is enabled by a latch mechanism which releasably couples the lead screw to the seat track. Upon release of the latch mechanism, the seat back is free to rotate to a forward dump position. Upon return of the seat back to its use position, the lead screw is latched to the slide track, fixing the seat back in place. The latch uses a toggle mechanism to latch and release the lead screw to and from the slide track. While the dump mechanism of the invention is described in the context of a power recliner, it can be utilized with a manual recliner to provide a dump mechanism with full position memory.

Further objects, features and advantages of the invention will become apparent from a consideration of the following description and the appended claims when taken in connection with the accompanying drawings.

DETAILED DESCRIPTION OF THE EMBODIMENT

Figure 1:
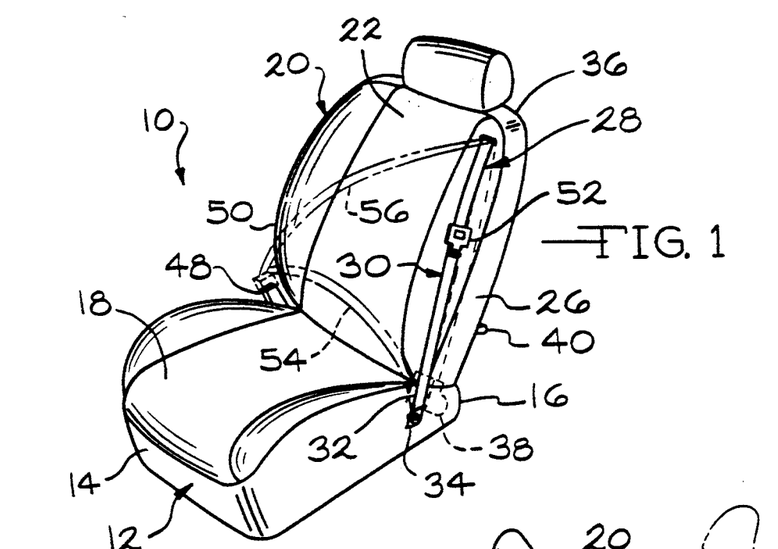
FIG. 1 is a perspective view of the vehicle seat assembly of the present invention.

Seat assembly 10 shown in FIG. 1 is an integrated seat with a belt restraint system incorporated in the seat assembly for the safety of a seat occupant. The seat assembly 10 is of a conventional nature having a lower seat cushion 12 with front and rear ends 14 and 16 respectively and an upper seating surface 18. A seat back 20 extends generally upwardly at the rear end of the seat cushion and has a front seating surface 22 against which the torso of a seat occupant rests. Assembly 10 includes a seat frame for supporting the seat cushion and seat back. The seat frame includes an upright column 24 extending upwardly in the seat back along one lateral side 26 of the seat assembly for carrying seat belt loads as described below.

Seat assembly 10 includes a passenger restraint system 28 for restraining an occupant in the seat assembly during a vehicle collision. The restraint system includes a seat belt webbing 30 used to form a lap belt and a shoulder belt for the seat occupant. The webbing 30 has a first end 32 that is attached to the seat frame adjacent the rear end 16 of the seat cushion along the side 26 of the seat assembly. The webbing is attached to the frame through a mounting plate 34 and an anchor bolt (not shown) in a conventional manner for attaching a seat belt webbing. When the restraint system is not in use, the webbing 30 extends from the mounting plate 34, upwardly toward the upper end 36 of the seat back, overlying the front surface 22 of the seat back adjacent the side 26 of the seat assembly.

Near the upper end 36 of the seat back, the webbing passes into the seat back and downward through the seat back to a seat belt webbing retractor 38 mounted to the seat frame. The retractor permits unwinding of the webbing in the absence of deceleration of the seat assembly but locks automatically upon deceleration to prevent further unwinding of the webbing from the retractor. While the retractor 38 is shown at the lower end of the seat back, it can be attached to the seat frame at other locations if desired.

A seat belt buckle 48 is mounted at the opposite lateral side 50 of the seat assembly, adjacent the rear end 16. The buckle 48 receives a clasp 52 that is slidably mounted to the seat belt webbing 30 between the mounting plate 34 and the location where the webbing passes into the seat back. To use the restraint system, a seat occupant will grasp the clasp 52 and pull the clasp and belt over his or her body to insert the clasp into the buckle 48. Doing so causes the webbing 30 to unwind from the retractor 46 and form a lap belt 54 crossing the seat occupant's lap and a shoulder belt 56 extending diagonally across the torso of the seat occupant. The single retractor restraint system 28 is only illustrative of the possible belt restraint systems for an integrated seat assembly. With respect to the present invention, the restraint system 28 is important in that the restraint load applied to the seat back must be transmitted from the seat back through the seat frame to the vehicle structure.

Figure 2:
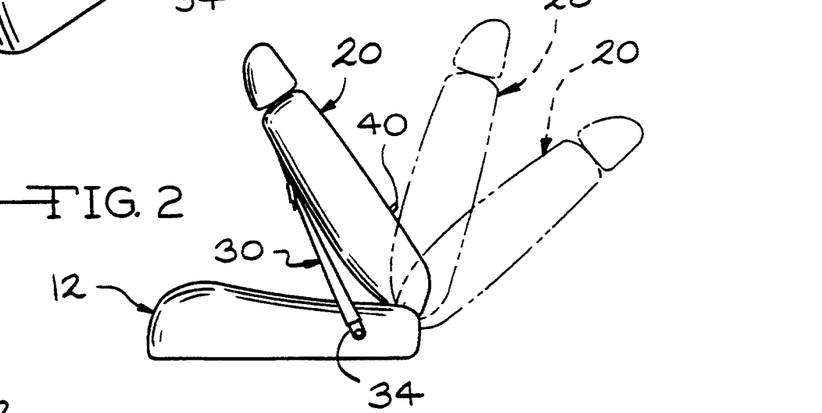
FIG. 2 is a side elevation view of the seat assembly of the present invention showing the seat back in various reclined positions as well as a forward dump position.

The seat assembly 10, as described in greater detail below, includes a dump mechanism which enables the seat back 20 to be forwardly rotated from the upright operative use position shown in FIG. 1 to the dump position shown in FIG. 2. When in the dump position, accessibility to the rear seat area of a two-door motor vehicle is improved. A release lever 40 extends rearward from the seat back for releasing a seat back latch to enable the seat back to rotate forward to the dump position. A biasing spring (not shown) is provided for urging the seat back to the forward dump position when released. The seat assembly is further provided with a recliner mechanism that is operable to adjust the use position of seat back 20 within a range of angular positions shown by the two phantom line positions of the seat back in FIG. 2.

Figure 3:
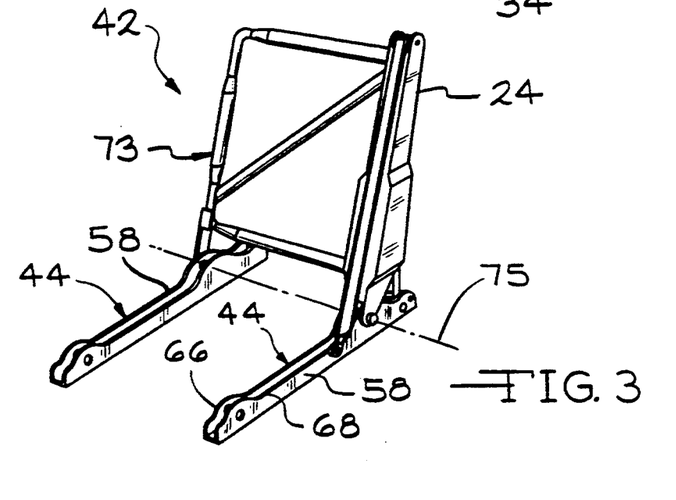
FIG. 3 is a perspective view of the seat assembly lower frame and seat back frame showing the seat belt webbing supported by the seat back frame.
Figure 4:
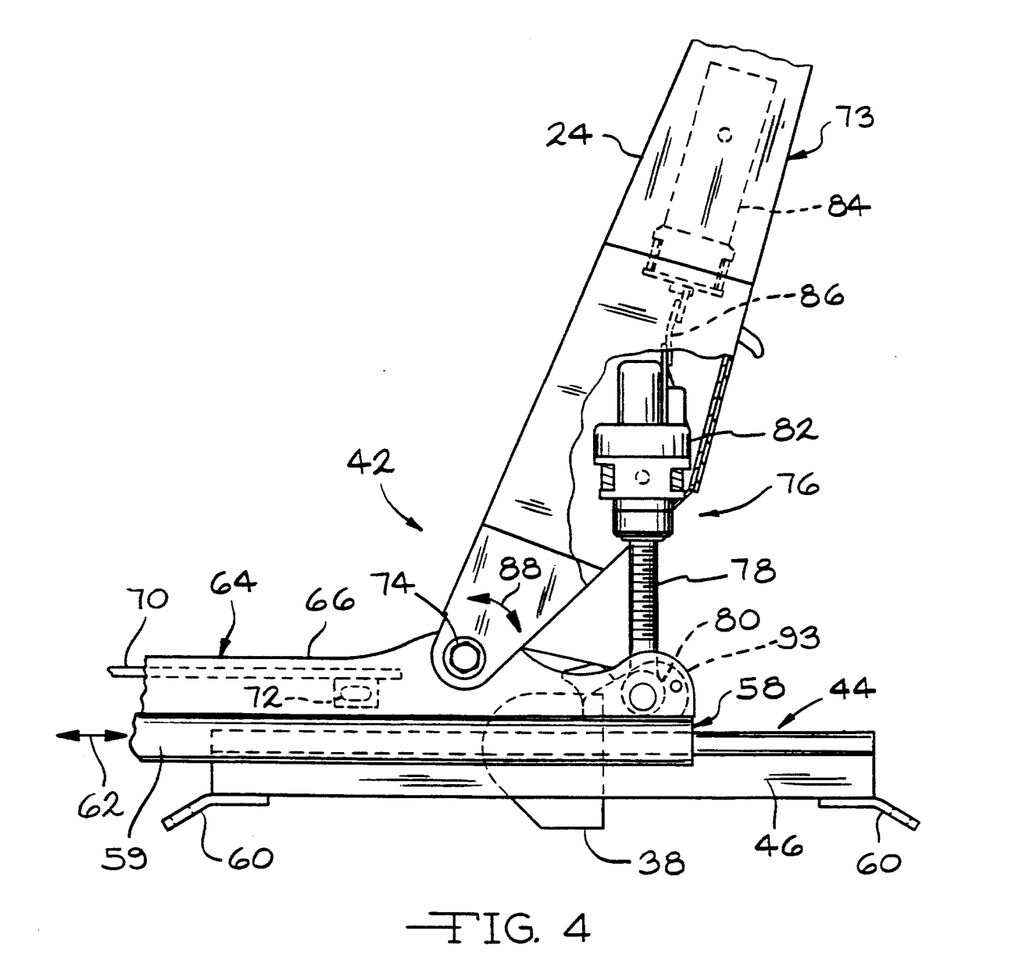
FIG. 4 is a side elevational view of a portion of the seat structure.

With reference to FIGS. 3 and 4, the frame 42 of the seat assembly 10 is shown. Frame 42 includes a lower frame 43 comprising a pair of slide tracks 44. The slide tracks 44 are fore and aft extending, one along each lateral side of the seat assembly. The slide tracks 44 each include a fixed rail 46 and a slide rail 58. Each fixed rail 46 has a pair of supports 60 used to attach the seat assembly 10 to the vehicle structure. The slide rails 58 are slidably movable in a fore and aft direction upon the fixed rails 46 as shown by the arrow 62. A latch mechanism (not shown) is provided to fix the fore and aft position of the slide rails relative to the fixed rails. The slide track shown in FIG. 4 is positioned along the lateral side 26 of the seat assembly, the same side of the seat assembly supporting the upper end of the shoulder belt 56.

The slide rail 58 includes a riser 64 which, in the embodiment shown, comprises inner and outer riser plates 66 and 68 respectively extending upwardly from a lower slide rail portion 59. A seat cushion frame in the form of seat pan 70 is mounted to the riser 64 by bolts 72, only one of which is shown in FIG. 4.

A seat back frame 73 is pivotally attached to the riser 64 for rotation about a transverse axis 75. The seat back frame 73 includes the upright column 24 which is mounted at its lower end to the riser 64 at side 26 of the seat assembly by pivot pin 74. Pin 74 defines the transverse axis 75.

A power recliner mechanism 76 is provided for adjusting the angular position of the seat back frame relative to the seat cushion and for holding the seat back in its adjusted position. The recliner mechanism includes a threaded lead screw 78 coupled at its lower end 80 to the slide rail 58 and as described in greater detail below. A housing 82 is pivotally coupled to the seat back frame and captures a spin nut 83 threadably engaging the screw 78. The coupling of the lead screw to the slide rail and the coupling of the housing 82 to the seat back are both spaced from the seat back pivot pin 74. The recliner transmits loads between the seat back and slide rails necessary to prevent rotation of the seat back and thereby, holds the seat back in place.

A motor 84 mounted to column 24 is connected to the drive housing by a flexible cable 86. The housing includes a gear train 85 to rotate the spin nut when driven by motor 84. Rotation of the spin nut causes the nut and housing to translate along the length of the lead screw 78, resulting in seat back rotation about the pivot pin 74 to adjust the angular position of the seat back. Because the spin nut is constantly threadably engaged with the lead screw 78 through the threads, the seat back 20 is secured to the slide rail even while the seat back angle is being adjusted.

The upright column 24 is hollow with the drive housing and motor being mounted within the column. Motor 84 is controlled by a remotely located switch (not shown) in a conventional manner for power seat controls.

The dump mechanism 79 shown in FIGS. 5-9 is used to release the lower end 80 of the lead screw from the slide rail, enabling free rotation of the seat back about its pivot pin 74. A lower end 80 of the lead screw 78 is formed with an eyelet 90 in which a pin 92 is placed. Pin 92 has ends which extend from the eyelet 90 in opposite directions. The ends of the pin are held in a hook 93 comprised of inner and outer hook members 94 and 96, respectively. The hook members are mounted to the slide track 44 and each hook member includes a projection 98 which extends through apertures in the inner and outer riser plates to hold the hook members in place and to transmit loads from the hook members to the seat frame. The two hook members are fastened to one another and to the riser plates by rivets 99 and 101. Spacers 103 are placed around the rivets, between the two hook members.

Figure 5:
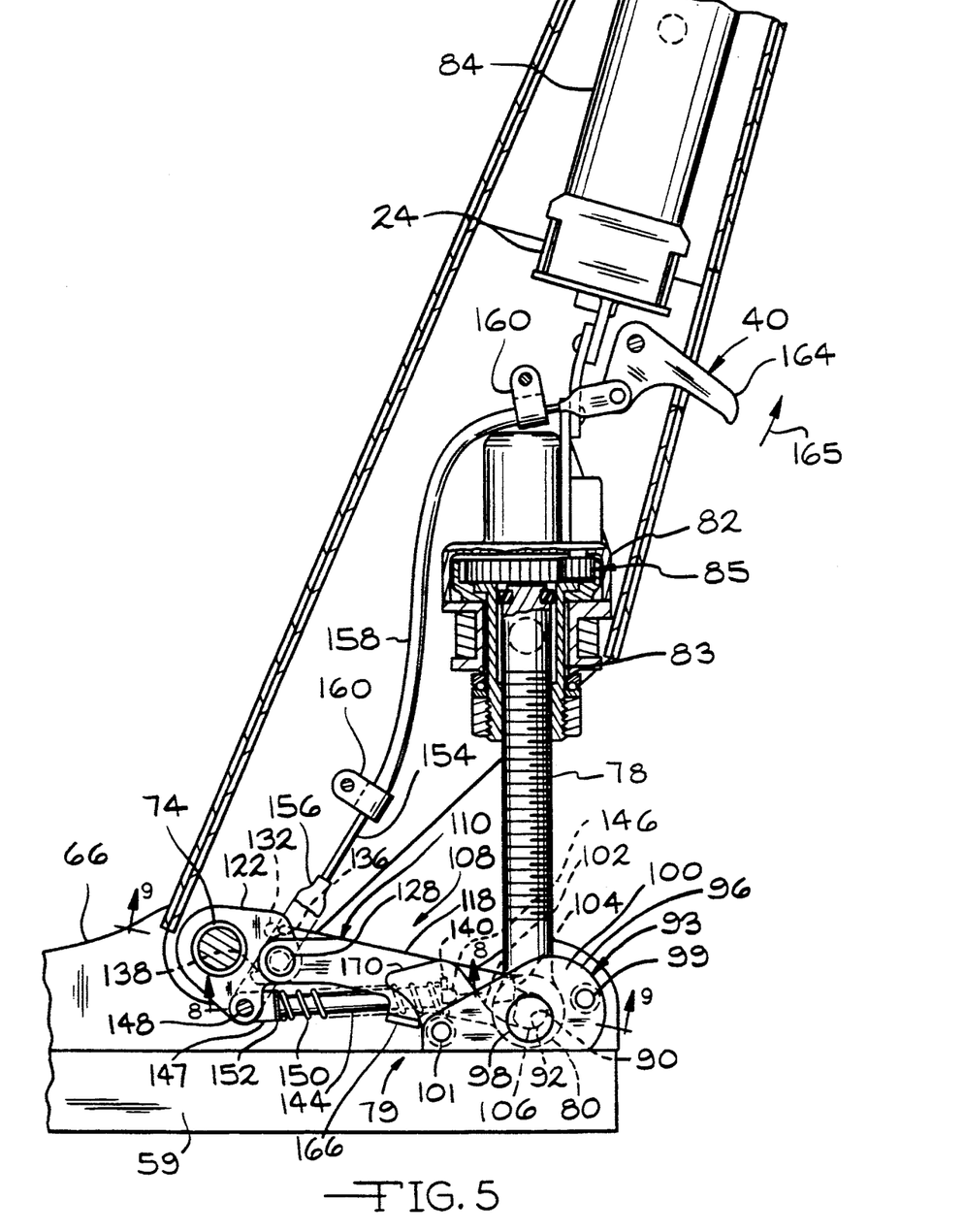
FIG. 5 is an enlarged elevational/sectional view of a portion of the seat structure shown in FIG. 4 illustrating the toggle mechanism in a latch position.
Figure 6:
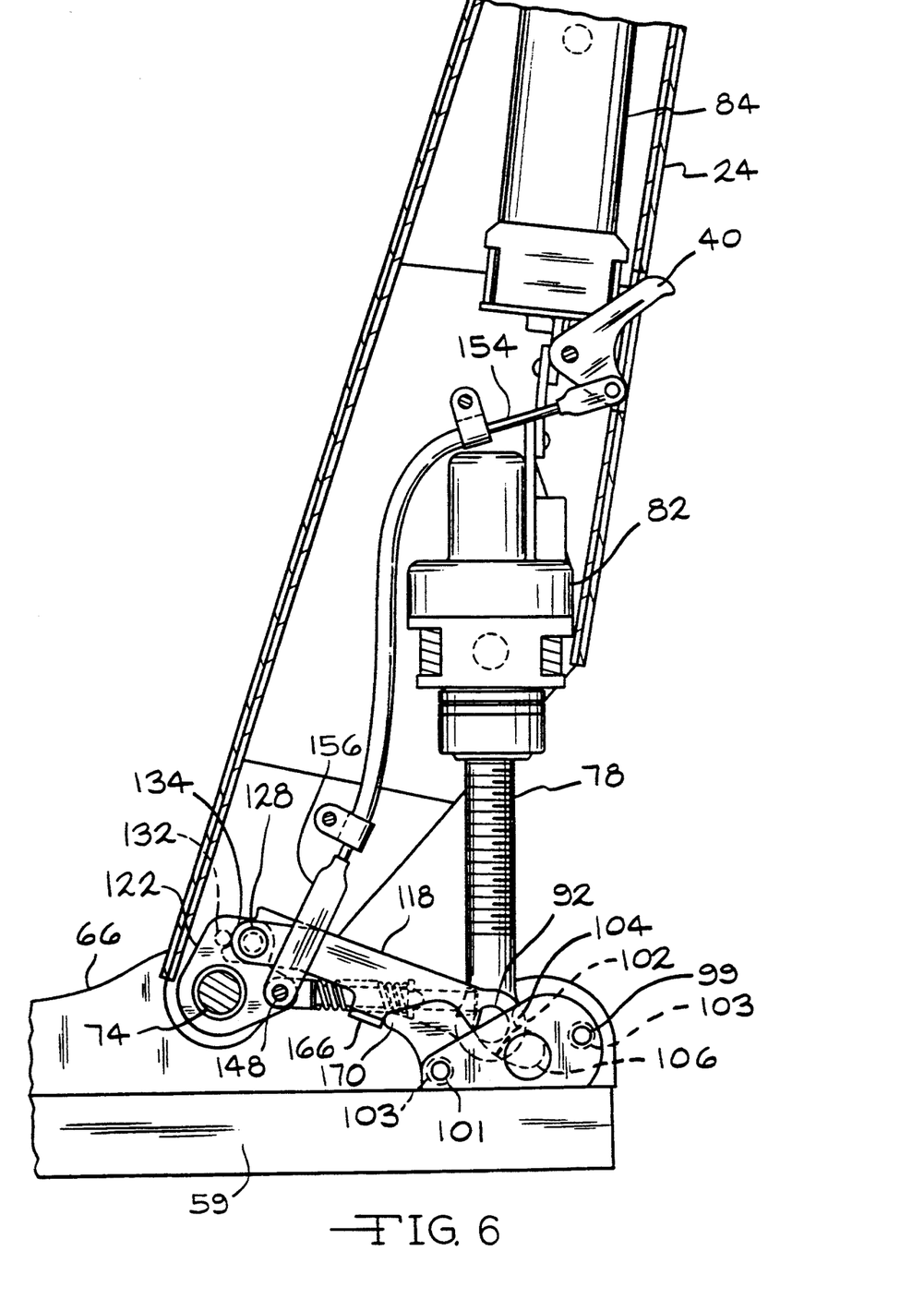
FIG. 6 is an elevational view of the seat structure shown in FIG. 5 with the toggle mechanism shown in a released position.

Each of the hook members is formed with a generally upstanding wall 100. The two opposing faces of the upstanding walls are each formed with a curved slot 102 extending from the upper end of the wall downward and rearwardly into the wall, underlying a lobe 104. The two ends of the pin 92 are guided through the slot 102 to the slot lower end 106 beneath the lobe 104. In this position, the pin 92 is restrained by the lobe 104 from upward movement.

The pin 92 is moved into and out of the slot 102 by a toggle latch mechanism 108. In addition to moving the pin 92 in and out of the slots 102, the toggle mechanism 108 operates to hold the pin in the slots when latched.

Figure 7:
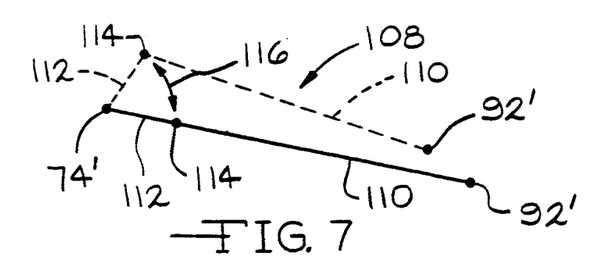
FIG. 7 is a schematic diagram illustrating the toggle latch mechanism.
Figure 8:
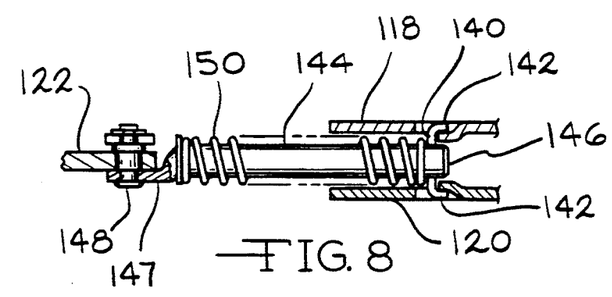
FIG. 8 is a sectional view as seen from substantially the line 8—8 of FIG. 5 illustrating the bias spring mounting.
Figure 9:
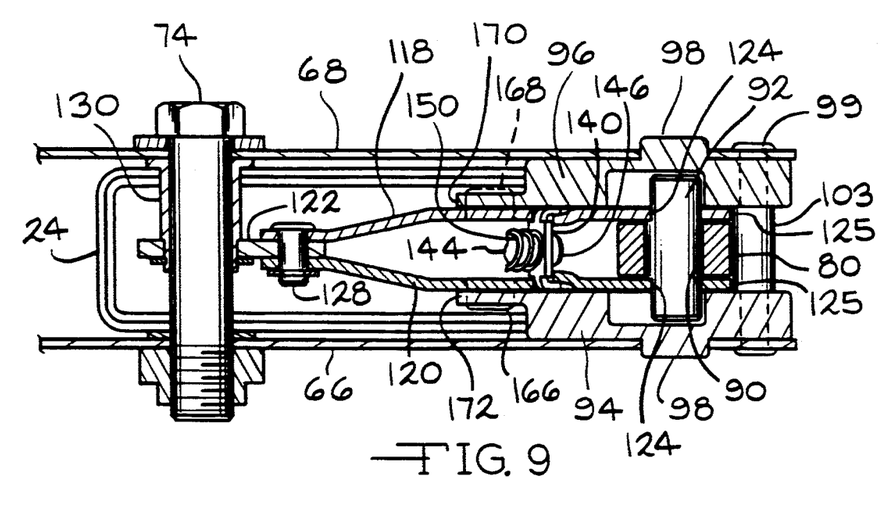
FIG. 9 is a partial sectional/partial bottom view of the latch mechanism as seen from the line 9—9 of FIG. 5.

Operation of the toggle mechanism 108 is shown schematically in FIG. 7. The toggle latch mechanism comprises a pair of links 110 and 112 pivotally joined together at a coupling 114 forming a "knee". The opposite end of the link 110 is joined to the pin 92 as indicated at 92'. The opposite end of link 112 is coupled to the seat back pivot point 74 as indicated at 74'.

With the pin 92 seated in the inner and outer hook members 94 and 96, the links 110 and 112 are substantially in a straight line as shown in the solid line in FIG. 7. The mechanism is unlatched by counterclockwise rotation of the link 112 about the pivot 74'. This bends the toggle mechanism at the knee formed by the coupling 114 as shown by the arrow 116. As the toggle mechanism bends, the point 92' is moved closer to the pivot 74', drawing the pin 92 from the hook 93. Reengagement of the latch is accomplished by returning the toggle mechanism from the bent position shown in broken line to the straight line position. This occurs as the seat back is returned to its use position with the pin 92 being guided by the slots 102 in the hook members.

With reference again to FIGS. 5 and 6, the structure forming the toggle mechanism 108 is described in detail. The link 110 of the toggle mechanism is formed by a pair of parallel bars 118 and 120. The link 112 is formed by the cam plate 122. The bars 118 and 120 have apertures 124 at one end 125. The bars are mounted on the pin 92 on each side of the lead screw. The opposite end 126 of the bars are joined to the cam plate 122 by pin 128. The cam plate 122 is mounted upon a bushing 130 surrounding the pivot pin 74. Cam plate 122 includes a stop pin 132 extending from one side which rides along a cam surface 134 formed in the edge of the bars 118 and 120 at end 126. The cam surface 134 has a pair of recesses forming detents 136 and 138. With the toggle mechanism in the latched position, the pin 132 is seated in the detent 136 and when the toggle mechanism is unlatched, the cam pin is moved to the detent 138 as the toggle mechanism bends at the knee formed by pin 128.

The two bars 118 and 120 are coupled to one another intermediate their ends by a spring stop plate 140 having a pair of ears 142 projecting through openings in the bars 118 and 120. A spring rod 144 has one end 146 extending through the spring stop plate 140. The opposite end 147 of the spring rod 144 is joined to the cam plate 122 by pin 148. A coil compression spring 150 is positioned on the spring rod 144 between a radial flange 152 near the end 147 and the spring stop plate 140.

In the latched position of the toggle mechanism 108 the pin 148 joining the spring rod to the cam plate is below a line extending between pivot pin 74 and pin 92. The spring 150 thus applies a force on the cam plate 122 urging the cam plate 122 in a clockwise direction, as viewed in FIGS. 5 and 6, to hold the toggle mechanism in the latch position with pin 92 seated in the hook 93. When the toggle mechanism is released and cam plate 122 is rotated counterclockwise to the release position, the pin 148 is raised "over center" above the line between pin 74 and pin 92 so that the spring will apply a counterclockwise force on the cam plate, thus holding the toggle mechanism in the bent release position.

A pull cable 154 has an end 156 which is also coupled to the cam plate by the pin 148. Cable 154 passes through a sheath 158 attached to the column 24 by brackets 160 and extends upwardly to the dump release lever 40. The opposite end of the cable 154 is coupled to the release lever 40 so that upward movement of the release lever handle 164, shown by the arrow 166, applies tension to the cable, pulling the cable and releasing of the toggle mechanism.

Release of the toggle mechanism by pulling upward on the cam plate 122 withdraws the pin 92 from the hook 93. This releases the connection of the lead screw 78 from the slide rail, freeing the seat back for forward rotation to the dump position. Upon return of the seat back from its upright operative position, the pin 92 will be received by the slots 102 in the hook 93 and be guided through the slots as the seat back continues its rearward travel. The slots will pull the toggle mechanism from its bent release position into the substantially straight line latch position as the pin 92 travels through the slots. This relatches the toggle mechanism, recoupling the pin 92 and lead screw 78 to the slide rail.

In the event that the toggle mechanism is inadvertently returned to its straight line latched position while the seat back is dumped forward, the bars 118 and 120 cooperate with the hook members to bend the toggle mechanism and enable the mechanism to relatch into the hook 93. This cooperation is accomplished by the outwardly extending flanges 166 and 168 in the bars 118 and 120. The flanges engage the forwardly extending lobes 170 and 172 of the hook members. When the flanges engage these lobes, they force the toggle mechanism back to its bent release position, enabling the flanges 166 and 168 to pass beyond the ends of the lobes 170 and once again align the pin 92 with the slots 102 of the two hook members.

One advantage of the dump mechanism of the present invention is that the position of the spin nut along the lead screw 78 remains in its adjusted position during the forward dumping of the seat back. Upon return of the seat back to its latched use position, the seat back returns to its adjusted angular position. Readjustment of the seat back position following dump operation is not required.

The hook members 94 and 96, lead screw 78 and pin 92 are made of steel to provide sufficient strength to accommodate the seat belt loads applied to the seat back during a vehicle collision. These components must carry the forces sufficient to counteract the forward rotating forces applied to the seat back by the shoulder belt. The toggle latch mechanism 108 operates to ensure that the pin 92 remains within the hook 93.

It is to be understood that the invention is not limited to the exact construction illustrated and described above, but that various changes and modifications may be made without departing from the spirit and scope of the invention as defined in the following claims.

We claim:

1. A seat assembly for a motor vehicle comprising:
   a frame comprising a lower seat frame and a seat back frame with upper and lower ends and extending generally upwardly from said lower seat frame, said seat back frame being mounted to said lower seat frame by a seat back pivot for rotation about a transverse axis adjacent said seat back frame lower end, said seat back frame having an operative position within an angular range of use positions about said transverse axis and said seat back frame being forwardly rotatable from said range of use positions to a forward dump position;
   holding means for holding said seat back frame in said operative position, said holding means being of a length extending between said seat back frame and said lower seat frame and being coupled to said lower seat frame and said seat back frame by first and second coupling means respectively, both said first and second coupling means being spaced from said seat back pivot to transmit loads between said seat back frame and said lower frame to resist rotation of said seat back frame about said seat back pivot whereby said seat back frame is held in said operative position, said holding means including recliner means for selectively moving said seat back frame to various operative positions within said angular range of use positions, said recliner means being operable to vary the said length of said holding means between said first and second coupling means whereby the operative position of said seat back frame is changed; and
   release means for selectively releasing said first coupling means whereby said seat back frame is free to rotate from said range of use positions to said forward dump position without changing the length of said holding means.

2. The seat assembly of claim 1 wherein said first coupling means includes means forming a latch hook defining a path of travel into and out of said hook and a latch pin movable into and out of said hook along said path, said latch pin being mounted to said holding means and when said latch pin is in said hook, said latch pin transferring loads from said holding means to said hook necessary to hold said seat back frame in place and when said latch pin is out of said hook, said seat back frame being free to rotate to said dump position, and said release means being operable for moving said latch pin into and out of said hook.

3. The seat assembly of claim 2 wherein said release means includes a toggle link mechanism having a pair of links each having first and second ends, said first ends being pivotally coupled to one another forming a knee and the second end of one of said links being pivotally coupled to said holding means and the second end of the other of said links being pivotally coupled to said frame, said links having a latch position in which said links hold said latch pin in said hook and a release position in which said pin is removed from said hook.

4. The seat assembly of claim 3 wherein said toggle link mechanism is pivotally coupled to said seat back frame at said seat back pivot.

5. The seat assembly of claim 3 further comprising bias means coupled to said toggle link mechanism to hold said toggle link mechanism in either said latch or release positions.

6. The seat assembly of claim 5 wherein said bias means includes an overcenter spring attached to one of said links to hold said toggle link mechanism in either said latch or release positions, the line of force applied by said spring to said one link passing over the pivotal coupling of said second end of said one link as said toggle link mechanism is moved between said latch and release positions whereby said spring applies a force on said one link to rotate said one link in opposite directions when said toggle link mechanism is in said latch or release positions.

7. The seat assembly of claim 3 further comprising actuating means for moving said toggle link mechanism from said latch to said release position, said actuating means including a pull cable having two ends, one end of said cable being attached to one of said links at a distance from the second end of said one link to rotate said one link about the second end thereof upon pulling of said cable and a second end of said cable being coupled to a pivotal actuation lever for applying tension to said cable upon rotation of said actuation lever to rotate said one link attached to said cable to move said toggle link mechanism from said latch position to said release position.

8. The seat assembly of claim 3 further comprising stop means adjacent said knee in said toggle link mechanism to stop the rotation of said pair of links relative to one another in the latch and release positions of said toggle link mechanism.

9. The seat assembly of claim 8 wherein said stop means includes a stop pin projecting from one of said links and engaging an edge surface of the other of said links, said edge surface having recessed detents into which said stop pin is seated when said toggle link mechanism is in said latch and release positions.

10. The seat assembly of claim 3 wherein said links include a first link pivotally coupled to said seat back frame and a second link comprised of a pair of spaced parallel bars, one bar on each side of said first link at said knee and each of said bars being coupled to said latch pin.

11. The seat assembly of claim 10 further comprising:
    a spring mounting rod pivotally coupled to said first link at a location spaced from said knee;
    a spring stop plate disposed between said bars forming said second link and having an aperture therethrough through which said spring rod extends; and
    a coil spring disposed on said rod between said first link and said stop plate for compression between said stop plate and said first link as said links are relatively rotated at said knee to shorten the distance between said second ends of said links.

12. The seat assembly of claim 3 wherein said holding means is adjustable in length between said first and second coupling means to adjust the operative position of said seat back frame within said range of use positions.

13. A seat assembly for a motor vehicle comprising:
a frame comprising a lower seat frame and a seat back frame with upper and lower ends and extending generally upwardly from said lower seat frame, said seat back frame being mounted to said lower seat frame by a seat back pivot for rotation about a transverse axis adjacent said seat back lower end, said seat back frame having an operative position within an angular range of use positions about said transverse axis and said seat back frame being forwardly rotatable from said range of use positions to a forward dump position;
holding means for holding said seat back frame in said operative position, said holding means including an elongated member extending between said seat back frame and said lower seat frame and being coupled to said lower seat frame by a first coupling means and being coupled to said seat back frame by a second coupling means, both said first and second coupling means being spaced from said seat back pivot to transmit loads between said seat back frame and said lower frame to resist rotation of said seat back frame about said seat back pivot whereby said seat back frame is held in said operative position;
said first coupling means including means forming a latch hook mounted to said lower seat frame and defining a path of travel into and out of said hook and a pin extending from said elongated member, said pin being movable into and out of said hook along said path, said pin transferring loads from said elongated member to said hook necessary to hold said seat back frame in place when said pin is in said hook and, when said latch pin is out of said hook, said seat back frame being free to rotate to said dump position; and
release means for selectively moving said pin from said hook whereby said seat back frame is free to rotate from said range of use positions to said forward dump position.

14. The seat assembly of claim 13 wherein said pin has two end portions extending in opposite directions from said elongated member and said means forming said hook includes two spaced hook members each having a slot defining said path for said pin end portions into said hook to capture said pin.

15. The seat assembly of claim 13 wherein said release means includes a toggle link mechanism having a first and second links each having first and second ends, said first ends of said links being pivotally coupled to one another forming a knee, the second end of said first link being pivotally coupled to said seat back frame and the second end of said second link being coupled to said pin whereby rotation of said links relative to one another at said knee effects the distance between the second ends of said links, moving said pin relative to said second end of said first link, said links having a latch position in which said links hold said latch pin in said hook and a release position in which said pin is removed from said hook by moving said pin toward said first link second end.

16. The seat assembly of claim 15 wherein said first link is pivotally coupled to said seat back frame at said seat back pivot.

17. The seat assembly of claim 15 further comprising an overcenter spring attached to said first link to hold said toggle link mechanism in either said latch or release positions, the line of force applied by said spring to said first link passing over the pivotal coupling of said first link to said seat back frame as said toggle link mechanism is moved between said latch and release positions whereby said spring applies a force on said first link urging said first link to rotate in one direction when said toggle link mechanism is in said latch position and urging said first link to rotate in the opposite direction when said toggle link mechanism is in said release position.

18. The seat assembly of claim 17 further comprising stop means for stopping the rotation of said first link as urged by said overcenter spring in both said latch and release positions.

19. The seat assembly of claim 15 wherein said pin has two end portions extending in opposite directions from said elongated member and said second link is comprised of a pair of spaced parallel bars, one bar on each side of said first link at said knee and one bar being coupled to each of said end portions of said pin.

* * * * *